(12) United States Patent
Drinfeld et al.

(10) Patent No.: US 9,934,267 B2
(45) Date of Patent: *Apr. 3, 2018

(54) DYNAMIC MASTER DATA MANAGEMENT

(71) Applicant: International Business Machines Corporation, Armonk, NY (US)

(72) Inventors: Dmitriy Drinfeld, Richmond Hill (CA); Stephanie J. Hazlewood, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/350,206

(22) Filed: Nov. 14, 2016

(65) Prior Publication Data
US 2017/0177654 A1    Jun. 22, 2017

Related U.S. Application Data

(63) Continuation of application No. 15/186,893, filed on Jun. 20, 2016, now Pat. No. 9,582,660, which is a continuation of application No. 14/972,137, filed on Dec. 17, 2015, now Pat. No. 9,454,559.

(51) Int. Cl.
*G06F 17/30* (2006.01)

(52) U.S. Cl.
CPC .. *G06F 17/30371* (2013.01); *G06F 17/30377* (2013.01)

(58) Field of Classification Search
USPC .............. 707/758, 713, 722, 736, 760, 764
See application file for complete search history.

(56) References Cited

U.S. PATENT DOCUMENTS

| | | | |
|---|---|---|---|
| 8,204,922 B2 | 6/2012 | Rangadass | |
| 8,327,419 B1 | 12/2012 | Korablev et al. | |
| 8,380,787 B2 | 2/2013 | Anand et al. | |
| 8,392,363 B2 | 3/2013 | Rangadass | |
| 8,429,220 B2 | 4/2013 | Wilkinson et al. | |
| 8,601,029 B2 | 12/2013 | Anand et al. | |
| 8,635,249 B2 | 1/2014 | Anand et al. | |
| 2009/0313309 A1* | 12/2009 | Becker | G06F 17/30595 |

(Continued)

OTHER PUBLICATIONS

McGinn et al., "Hybrid MDM: The Best of Both MDM Worlds", IBM Data Magazine, May 24, 2013, Printed on Jun. 4, 2015, Copyright © 2015, IBM Corporation, 7 pages, <http://ibmdatamag.com/2013/05/hybrid-mdm-the-best-of-both-mdm-worlds/>.

(Continued)

*Primary Examiner* — Sana Al Hashemi
(74) *Attorney, Agent, or Firm* — Steven L. Fisher-Stawinski

(57) ABSTRACT

A computer-implemented method includes, in a master data management system, receiving a persistent modification request affecting a master data attribute, determining that no preexisting master record exists in the master data management system for the master data attribute, and, responsive to determining that no preexisting master record exists for the master data attribute, adding a new master data attribute and associated new ownership information for the master data attribute to the master data management system, based on the persistent modification request. A corresponding computer program product and computer system are also disclosed.

8 Claims, 3 Drawing Sheets

(56) References Cited

U.S. PATENT DOCUMENTS

| | | |
|---|---|---|
| 2013/0325881 A1 | 12/2013 | Deshpande et al. |
| 2014/0324857 A1 | 10/2014 | Hazelwood et al. |
| 2014/0351205 A1 | 11/2014 | Fennell et al. |
| 2015/0127606 A1 | 5/2015 | Hazelwood et al. |
| 2015/0127609 A1 | 5/2015 | Hazelwood et al. |
| 2015/0127672 A1 | 5/2015 | Hazelwood et al. |
| 2015/0127690 A1 | 5/2015 | Hazelwood et al. |
| 2015/0193795 A1* | 7/2015 | Mitry .................. H04W 4/04 |
| | | 705/7.34 |

OTHER PUBLICATIONS

Drinfeld et al., "Dynamic Master Data Management," U.S. Appl. No. 14/972,137, filed Dec. 17, 2015.

Drinfeld et al., "Dynamic Master Data Management," U.S. Appl. No. 15/186,893, filed Jun. 20, 2016.

List of IBM Patents or Patent Applications Treated as Related, Signed Nov. 14, 2016, 2 pages.

* cited by examiner

DYNAMIC MASTER DATA MANAGEMENT

BACKGROUND

The present invention relates generally to the field of master data management, and more particularly to managing ownership of attributes in master data management systems.

Master data management (MDM) systems provide a platform for ensuring consistency of data across multiple systems and databases deployed by an enterprise user. For example, a bank may have multiple source systems for interacting with customers in different ways, such as deposit accounts, investment accounts, loans, payment card management, etc., all of which may need to interact with the customer's contact information. The bank may deploy an MDM system to ensure that the customer contact information is managed consistently.

Generally, MDM systems may be characterized as physical, virtual, or hybrid. In a virtual MDM implementation, data remains fragmented across various source systems in a distributed manner with a central indexing service. By contrast, in a physical MDM implementation, master data is stored and/or created in a centralized system, which is accessed by or pushed to the various source systems.

Hybrid MDM implementations blend the virtual and physical styles of management by allowing source systems to manage of some attributes and the central management of other attributes. In hybrid MDM implementations, several capabilities are exposed that allow for seamless movement of master data entities between their virtual and physical representations. Enterprises continue to face challenges in managing the ownership of various attributes in MDM systems, particularly hybrid MDM systems.

SUMMARY

A computer-implemented method includes, in a master data management system, receiving a persistent modification request affecting a master data attribute, determining that no preexisting master record exists in the master data management system for the master data attribute, and, responsive to determining that no preexisting master record exists for the master data attribute, adding a new master data attribute and associated new ownership information for the master data attribute to the master data management system, based on the persistent modification request. A corresponding computer program product and computer system are also disclosed.

DETAILED DESCRIPTION

Figure 1:
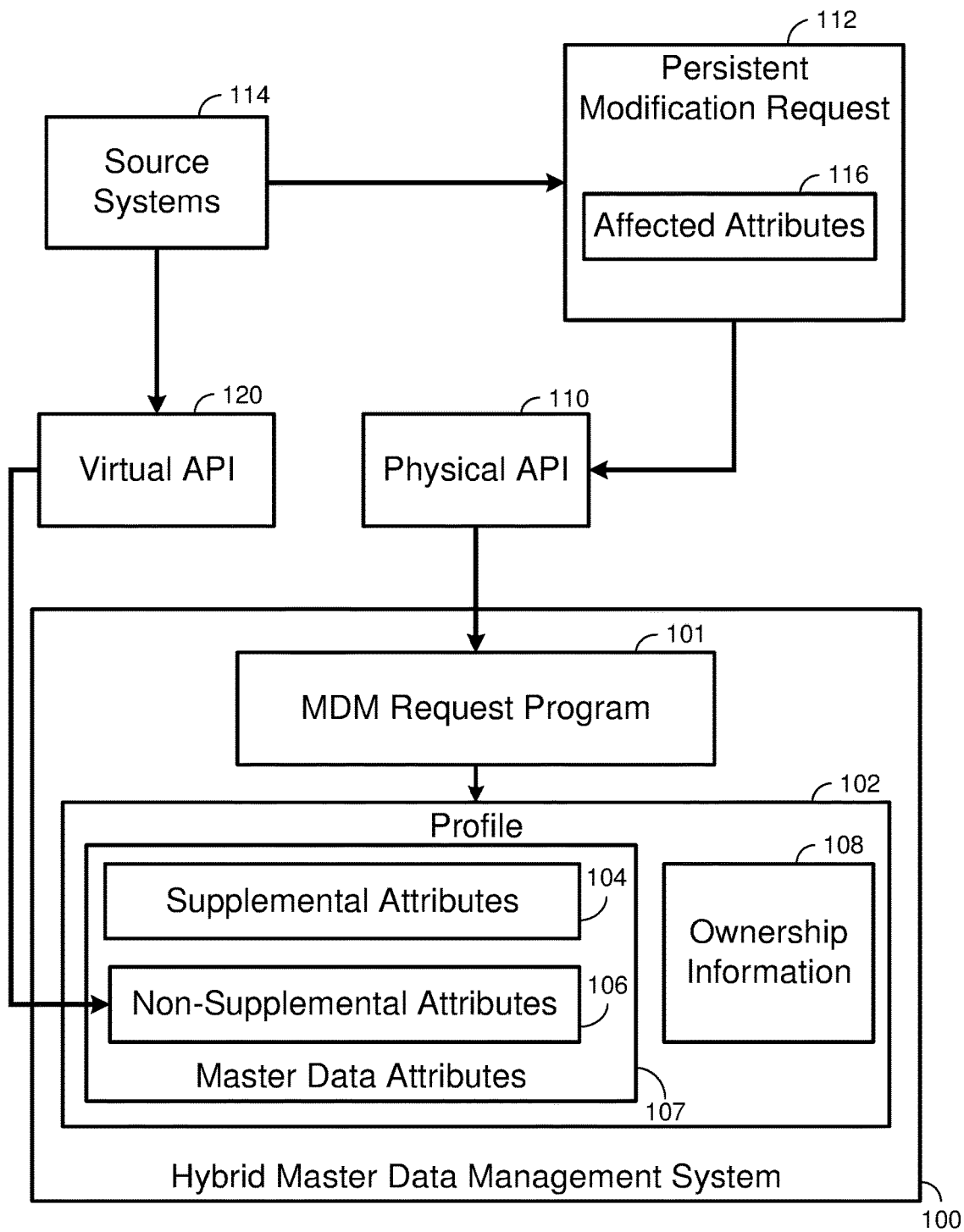
FIG. 1 is block diagram depicting an exemplary operational environment incorporating various logical components for at least one embodiment of the present invention.

Referring now to the invention in more detail, FIG. 1 is a block diagram illustrating an exemplary operational environment incorporating various logical components for at least one embodiment of the present invention. Broadly, an enterprise deploys a hybrid master data management (MDM) system 100 for managing data consistency across multiple source systems 114. Source systems may include any data management system deployed by the enterprise, for example, a bank deploying MDM may operate different source systems for checking and savings accounts, investment accounts, loan accounts, payment cards, etc. The hybrid MDM system 100 may be understood as deployed on any standalone or distributed computer or computing environment, such as the exemplary computer of FIG. 3. The hybrid MDM system 100 maintains a profile 102, which may include various master data attributes 107 including supplemental attributes 104 and non-supplemental attributes 106, and corresponding ownership information 108. The profile 102 may be understood to refer to a collection of attributes, and not any specific system, hardware unit, or user. Ownership of any master data attribute 107, in the context of the present invention, means the right to modify the value of the attribute, and the ownership information 108 stores whether each master data attribute 107 is centrally or virtually (i.e. source system) owned. In various embodiments, the non-supplemental attributes 106 may be understood as owned by various source systems 114, while supplemental attributes 104 may be understood as centrally owned and thus "supplemental" to the data maintained by the source systems 114.

In various embodiments of hybrid MDM, hybrid MDM is deployed by an enterprise as part of a transition strategy from virtual MDM to physical MDM wherein disparate preexisting source systems 114 are harmonized via MDM, but not all are immediately upgraded to take advantage of profile 102 and its central control of data. To support this, the hybrid MDM system 100 is accessible at least through a physical application programming interface (API) 110 and a virtual application programming interface (API) 120. Embodiments of the present invention may exist as an MDM request program 101, which may receive a persistent modification request 112 via the physical API 110. Various source systems 114 may access the master data attributes 107 via the physical API 110 by sending a persistent modification request 112 to change various affected attributes 116 or directly via the virtual API 120, with the understanding that, as the enterprise continues to develop, update, or replace its source systems 114 over time, the virtual API 120 will be disfavored and the physical API 110 preferred, until all systems use the physical API 110, and the system may be described as physical MDM.

The inventors have observed and/or recognized that existing implementations of hybrid MDM require the ownership information 108 to be defined in. The definitions typically include all of the master data attributes 107. For the externally managed non-supplemental attributes 106, this includes defining survivorship rules for when various source systems 114 present updates through the virtual API 120. For the centrally managed supplemental attributes 104, the definition includes which supplemental attributes 104 will exist and which source systems 114 will be permitted to change them. The inventors have observed and/or recognized that allowing the supplemental attributes 104 to be dynamically created and owned would reduce the design-time burden on the enterprise MDM user. While various embodiments of the present invention may address this and other problems and/or offer this or other advantages, it will be understood that the presence of such benefits are not essential to the practice of the invention, and accordingly, the invention is not to be understood as limited with respect to any problem recognized or advantaged discovered by the inventors.

Figure 2:
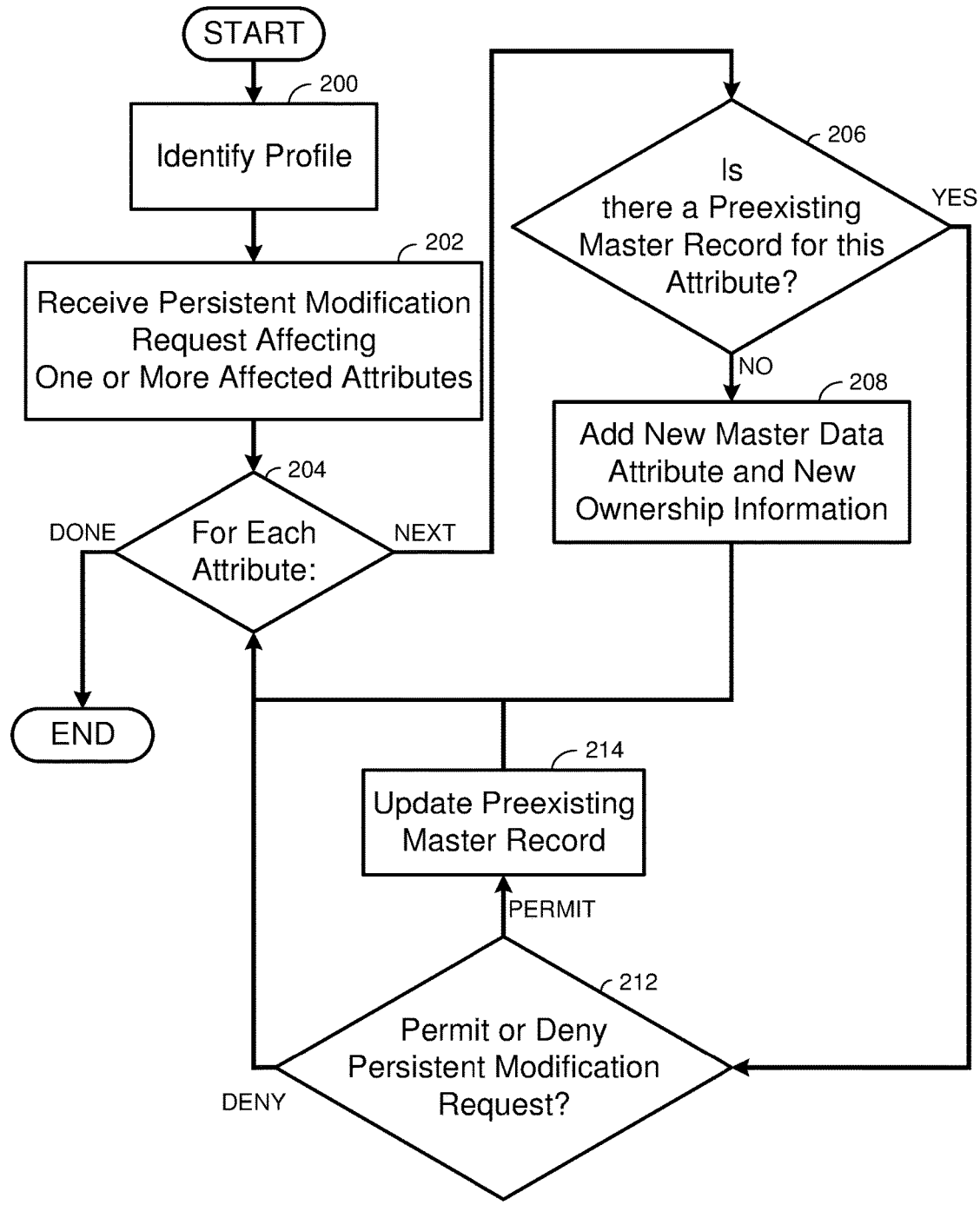
FIG. 2 is a flowchart diagram depicting various operational steps for an MDM request program, in accordance with at least one embodiment of the present invention.

Referring now to FIG. 2, FIG. 2 is a flowchart diagram depicting various operational steps for the MDM request program 101, in accordance with various embodiments of the present invention. At step 200, the MDM request program identifies a profile 102. In accordance with at least one MDM model (specifically, a hybrid MDM model, though physical and virtual MDM models may be adapted for the present invention as well), the profile 102 may be administered, updated, and/or accessed by the MDM request program 101 via the physical API 110. At step 202, the MDM request program 101 receives the persistent modification request 112 from one of the source systems 114. The persistent modification request 112 is directed to the profile 102, which includes a plurality of master data attributes 107. The persistent modification request 112 may include any type of insert, update, delete, or other database modification statement or action that, if permitted, would persistently modify the contents of the profile 102. The persistent modification request 112 may affect one or more master data attributes 107; those that are affected are termed "one or more affected attributes".

At decision block 204, the MDM request program 101 iterates over the affected attributes affected by the persistent modification request 112. For each affected attribute of the one or more affected attributes, at decision block 206, the MDM request program 101 determines whether there is a preexisting master record for the affected attribute. A preexisting master record is a previously set value for the variable designated by affected attribute in the profile 102. Specifically, the MDM request program 101 either identifies a preexisting master record associated with preexisting ownership information for the affected attribute or determines that no preexisting master record exists.

Referring still to FIG. 2, if there is no preexisting master record for the affected attribute (decision block 206, NO branch), then, responsive to determining that no preexisting master record exists, the MDM request program 101 at step 208 adds a new master data attribute 107 and new ownership information to the profile 102, based on the persistent modification request 112. Specifically, the persistent modification request 112 includes the values of the affected attributes 116 and the associated source ownership data from which the new master data attribute is created. In the hybrid MDM system 100, the ownership data may specify, for each master data attribute 107, ownership selected from the group consisting of (a) virtual ownership; and (b) central ownership. When adding a new master data attribute, central ownership may be intended in the interest of migrating the MDM system away from the virtual API 120 and toward the physical API 110.

Referring still to FIG. 2, if there is a preexisting master record for the affected attribute (decision block 206, YES branch), then, at decision block 212, responsive to identifying the preexisting master record for the affected attribute, the MDM request program 101 selectively permits or denies the persistent modification request as to the affected attribute. Permitting or denying the persistent modification request 112 may be based on various rules, including the particular source system 114, the ownership information 108, and other bases. In some embodiments, selectively permitting or denying the persistent modification request 112 as to the affected attribute includes denying the persistent modification request 112 as to the affected attribute, if the preexisting ownership information indicates virtual ownership of the affected attribute and the persistent modification request 112 is received via the physical application programming interface 110. In such embodiments, changes to supplemental attributes 104 may be generally allowed, or selectively allowed subject to enterprise-specific business rules. At step 214, responsive to permitting the persistent modification request 112 as to the affected attribute, the MDM request program 101 updates the preexisting master record for the affected attribute, based on the persistent modification request 112.

In some embodiments, the MDM request program 101 may detect a conflict between the persistent modification request 112 and one or more master records for the affected attributes and resolve the conflict by a stewardship event. A conflict condition may arise when a source system 114 attempts to create a new supplemental attribute 104 where a non-supplemental attribute 106 already exists, or where an update to an existing supplemental attribute 104 is suspect due to the application of one or more-entity specific business rules to the persistent modification request 112. More formally, in such embodiments, the MDM request program 101 may, for each affected attribute of the one or more affected attributes 116, detect a conflict between the persistent modification request 112 as to the affected attribute and any of the plurality of master data attributes 107 that has central ownership (by contrast to the herein described steps, a conflict with a master data attribute 107 that has virtual ownership may be simply denied). In such embodiments, selectively permitting or denying the persistent modification request 112 as to the affected attribute includes generating a stewardship event.

Generating a stewardship event may include at least one stewardship action selected from the group consisting of (a) sending a task notification to a stewardship entity; and (b) reconciling the conflict according to one or more business rules. A stewardship entity may be a computer service, business unit, or one or more individual users, or some combination thereof that is authorized to modify the content of supplemental attributes 104 within the profile 102. The stewardship entity may be tasked with responding, investigating, and/or resolving the conflict. Alternatively, some embodiments may incorporate automatic conflict resolution according to business rules. For example, a bank entity user may treat a changed customer address as a conflict, if it comes from a third party source such as a credit report, but allow it if it comes from a privileged source, such as the customer updating his or her address via a web interface.

In some embodiments, the MDM system 100 may implement a transaction system supports multi-step operations that can be rolled back in case of a failure at any step, or continued until all steps complete successfully, and then committed. The persistent modification request 112 may be part of a transaction on the MDM system 100 as one step of several steps that may comprise the transaction. Steps of the transaction may include persistent modification requests such as the persistent modification request 112, but may also include non-modifying data access and/or query operations directed to the profile 102 or operations that are unrelated to the profile 102. In such embodiments, responsive to allowing the persistent modification request 112 for all of the one or more affected attributes, the MDM request program 101 may continue with the transaction by proceeding to the next step or committing the transaction, if all steps are completed. Responsive to denying the persistent modification request 112 for any of the one or more affected attributes, the MDM request program 101 may roll back and/or abort the transaction.

Figure 3:
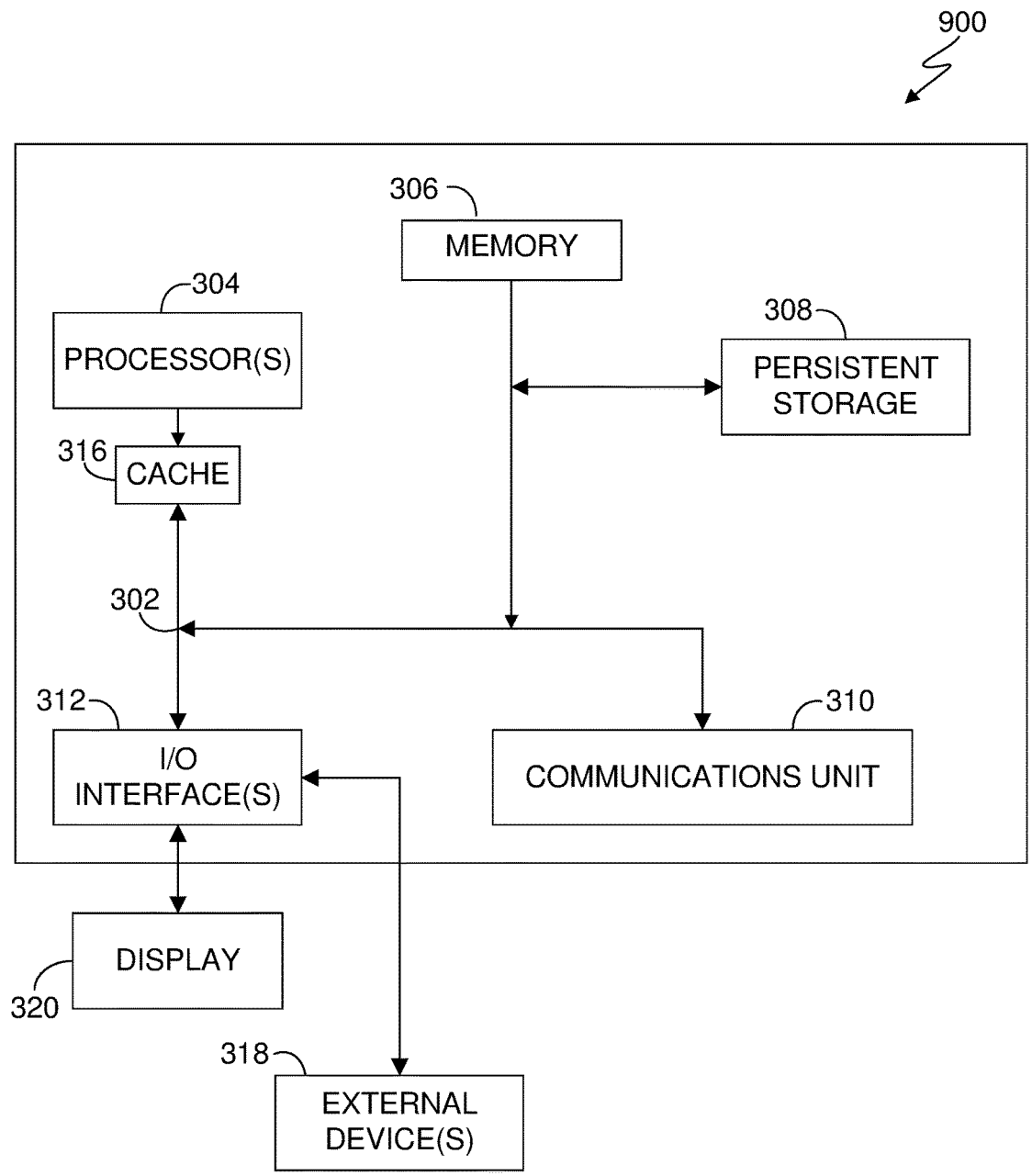
FIG. 3 is a block diagram of various components of a computer system suitable for performing various methods, in accordance with at least one embodiment of the present invention.

FIG. 3 is a block diagram depicting components of a computer 300 suitable for executing the MDM request program 101. FIG. 3 displays the computer 300, the one or more processor(s) 304 (including one or more computer processors), the communications fabric 302, the memory 306, the RAM, the cache 316, the persistent storage 308, the communications unit 310, the I/O interfaces 312, the display 320, and the external devices 318. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the cache 316, the computer processor(s) 304, the memory 306, the persistent storage 308, the communications unit 310, and the input/output (I/O) interface(s) 312. The communications fabric 302 may be implemented with any architecture suitable for passing data and/or control information between the processors 304 (e.g., microprocessors, communications processors, and network processors, etc.), the memory 306, the external devices 318, and any other hardware components within a system. For example, the communications fabric 302 may be implemented with one or more buses or a crossbar switch.

The memory 306 and persistent storage 308 are computer readable storage media. In the depicted embodiment, the memory 306 includes a random access memory (RAM). In general, the memory 306 may include any suitable volatile or non-volatile implementations of one or more computer readable storage media. The cache 316 is a fast memory that enhances the performance of computer processor(s) 304 by holding recently accessed data, and data near accessed data, from memory 306.

Program instructions for the MDM request program 101 may be stored in the persistent storage 308 or in memory 306, or more generally, any computer readable storage media, for execution by one or more of the respective computer processors 304 via the cache 316. The persistent storage 308 may include a magnetic hard disk drive. Alternatively, or in addition to a magnetic hard disk drive, the persistent storage 308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 310, in these examples, provides for communications with other data processing systems or devices. In these examples, the communications unit 310 may include one or more network interface cards. The communications unit 310 may provide communications through the use of either or both physical and wireless communications links. MDM request program may be downloaded to the persistent storage 308 through the communications unit 310. In the context of some embodiments of the present invention, the source of the various input data may be physically remote to the computer 300 such that the input data may be received and the output similarly transmitted via the communications unit 310.

The I/O interface(s) 312 allows for input and output of data with other devices that may operate in conjunction with the computer 300. For example, the I/O interface 312 may provide a connection to the external devices 318, which may include a keyboard, keypad, a touch screen, and/or some other suitable input devices. External devices 318 may also include portable computer readable storage media, for example, thumb drives, portable optical or magnetic disks, and memory cards. Software and data used to practice embodiments of the present invention may be stored on such portable computer readable storage media and may be loaded onto the persistent storage 308 via the I/O interface(s) 312. The I/O interface(s) 312 may similarly connect to a display 320. The display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising, in a master data management system:
   receiving a persistent modification request affecting a master data attribute;
   said persistent modification request being received through a physical application programming interface
   responsive to determining that a preexisting master record exists in said master data management system for said master data attribute that identifies virtual ownership of said master data attribute, denying said persistent modification request as to said master data attribute.

2. The computer-implemented method of claim 1, wherein:
   said persistent modification request is part of a transaction on said master data management system;
   and, further comprising:
      responsive to denying said persistent modification request, rolling back said transaction.

3. The computer-implemented method of claim 1, further comprising:
   responsive to determining that no preexisting master record exists for said master data attribute, adding a new master data attribute and associated new ownership information for said master data attribute to said master data management system, based on said persistent modification request.

4. A computer-implemented method comprising, in a master data management system:
   receiving a persistent modification request affecting a master data attribute;
   said persistent modification request being received through a physical application programming interface;
   responsive to determining that a preexisting master record exists in said master data management system for said master data attribute that identifies central ownership of said master data attribute, allowing said persistent modification request.

5. The computer-implemented method of claim 4, wherein:
   said persistent modification request is part of a transaction on said master data management system;
   and, further comprising:
      responsive to allowing said persistent modification request, rolling back said transaction.

6. The computer-implemented method of claim 4, further comprising:
   responsive to determining that no preexisting master record exists for said master data attribute, adding a new master data attribute and associated new ownership information for said master data attribute to said master data management system, based on said persistent modification request.

7. A computer-implemented method comprising, in a master data management system:
   receiving a persistent modification request affecting a master data attribute;
   determining that a preexisting master record exists in said master data management system for said master data attribute that identifies central ownership of said master data attribute;
   detecting a conflict between said persistent modification request and said master data attribute based on said master data attribute having central ownership; and
   responsive to detecting said conflict, generating a stewardship event.

8. The computer-implemented method of claim 7, wherein generating a stewardship event comprises at least one stewardship action selected from the group consisting of:
   (a) sending a task notification to a stewardship entity; and
   (b) reconciling said conflict according to one or more business rules.

* * * * *